US010507598B2

(12) United States Patent
Ahmed

(10) Patent No.: US 10,507,598 B2
(45) Date of Patent: Dec. 17, 2019

(54) METHOD OF RECYCLING CARBON FIBER PREPREG WASTE AND TRANSPARENT THERMOPLASTIC WASTE

(71) Applicant: UNITED ARAB EMIRATES UNIVERSITY, Al Ain (AE)

(72) Inventor: Waleed Khalil Ahmed, Al Ain (AE)

(73) Assignee: United Arab Emirates University, Al-Ain (AE)

( * ) Notice: Subject to any disclaimer, the term of this patent is extended or adjusted under 35 U.S.C. 154(b) by 0 days.

(21) Appl. No.: 16/423,950

(22) Filed: May 28, 2019

(65) Prior Publication Data

US 2019/0275707 A1 Sep. 12, 2019

Related U.S. Application Data

(63) Continuation-in-part of application No. 15/680,981, filed on Aug. 18, 2017, now Pat. No. 10,328,610.

(51) Int. Cl.
| | |
|---|---|
| B29B 17/04 | (2006.01) |
| B29B 17/00 | (2006.01) |
| B29C 43/00 | (2006.01) |
| B29C 43/14 | (2006.01) |
| B29B 13/10 | (2006.01) |
| B29K 105/12 | (2006.01) |
| B29K 105/00 | (2006.01) |
| B29K 105/26 | (2006.01) |
| B29K 69/00 | (2006.01) |

(52) U.S. Cl.
CPC .......... *B29B 17/0412* (2013.01); *B29B 13/10* (2013.01); *B29B 17/0005* (2013.01); *B29C 43/003* (2013.01); *B29C 43/006* (2013.01); *B29C 43/146* (2013.01); *B29C 2043/147* (2013.01); *B29K 2069/00* (2013.01); *B29K 2105/12* (2013.01); *B29K 2105/251* (2013.01); *B29K 2105/26* (2013.01); *B29K 2995/0026* (2013.01)

(58) Field of Classification Search
None
See application file for complete search history.

(56) References Cited

U.S. PATENT DOCUMENTS

| | | | | |
|---|---|---|---|---|
| 5,647,544 | A | * | 7/1997 | Greiner ............... B03B 1/00 241/17 |
| 2008/0289276 | A1 | | 11/2008 | Raponi |
| 2010/0267868 | A1 | * | 10/2010 | Takahashi ............. B29B 9/14 524/79 |
| 2011/0036481 | A1 | * | 2/2011 | Inserra Imparato ................. B29B 17/0042 156/94 |
| 2015/0151454 | A1 | * | 6/2015 | Herrmann ........... B29C 48/0011 264/130 |
| 2016/0214278 | A1 | * | 7/2016 | Dauner ............. B29B 17/0042 |
| 2017/0174860 | A1 | * | 6/2017 | Witte .................... B29B 17/00 |
| 2017/0291332 | A1 | * | 10/2017 | Braley ................. B29C 43/003 |
| 2018/0229393 | A1 | * | 8/2018 | Corden ............. B29B 17/0026 |
| 2018/0326678 | A1 | * | 11/2018 | Villalon ............ B29B 17/0026 |
| 2019/0016016 | A1 | * | 1/2019 | McKay .............. B29B 17/0412 |
| 2019/0054662 | A1 | | 2/2019 | Ahmed et al. |
| 2019/0099920 | A1 | * | 4/2019 | Bank .................... C08G 59/686 |

FOREIGN PATENT DOCUMENTS

| | | | | |
|---|---|---|---|---|
| DE | 2337821 | A1 | | 2/1975 |
| DE | 3744728 | A1 * | 12/1988 | ............. B29B 13/10 |
| DE | 3937249 | A1 | | 5/1991 |
| DE | 19743545 | A1 * | 4/1998 | ........ B29B 17/0026 |
| EP | 0875452 | A2 | | 11/1998 |
| JP | 10131052 | A | | 5/1998 |
| JP | 2016079376 | A | | 5/2016 |
| RU | 2347791 | C1 | | 2/2009 |
| TW | 201239898 | A | | 10/2012 |
| WO | WO-8909123 | A1 * | 10/1989 | ............... B29B 9/14 |

OTHER PUBLICATIONS

Nilakantan et al. "Reuse and upcycling of aerospace prepreg scrap and waste." Reinforced Plastics 59.1 (2015): 44-51.

* cited by examiner

*Primary Examiner* — Mary Lynn F Theisen
(74) *Attorney, Agent, or Firm* — Richard C. Litman; Nath, Goldberg & Meyer

(57) ABSTRACT

The method of recycling carbon fiber prepreg waste and transparent thermoplastic waste includes shredding of a volume of transparent thermoplastic waste and a volume of carbon fiber prepreg waste, where the carbon fiber prepreg waste includes a colored backing film. The colored backing film may have a plurality of colors associated therewith, yielding a mixture of multi-colored shreds. A mold is filled with the shredded volume of transparent thermoplastic waste, and the mold is inserted and compressed in a hot press. The shredded volume of transparent thermoplastic waste is cured in the hot press to produce a transparent sheet. The shredded volume of carbon fiber prepreg waste is then heated, such as, for example, with hot air, and then spread on the transparent sheet. The heated, shredded volume of carbon fiber prepreg waste and the transparent sheet are hot pressed to form a colored sheet with a transparent protective layer.

11 Claims, No Drawings

METHOD OF RECYCLING CARBON FIBER PREPREG WASTE AND TRANSPARENT THERMOPLASTIC WASTE

CROSS-REFERENCE TO RELATED APPLICATION

This application is a continuation-in-part of U.S. patent application Ser. No. 15/680,981, filed on Aug. 18, 2017, now U.S. Pat. No. 20,328,610.

BACKGROUND

1. Field

The disclosure of the present patent application relates to recycling of waste materials, and particularly to a method of recycling carbon fiber prepreg waste and transparent thermoplastic waste.

2. Description of the Related Art

Reinforcing fabrics which have been pre-impregnated with resin are commonly referred to as "prepregs". Prepregs are used in a large number of different industries, with over ten million tons of prepregs being manufactured each year. Approximately 20% of all prepreg production goes to the aerospace industry, particularly in the form of carbon fiber prepregs. Since prepregs are fabrics, which must be cut or shaped for their particular applications, large amounts of prepreg waste are produced in the form of offcuts, scrap and defective material. Adding to the waste, prepregs are typically sold and transported with peel-off, protective backing layers. Thus, the waste not only includes the prepreg material itself, but the additional backing material, which is commonly manufactured from dyed or otherwise colored polyethylene.

Uncured carbon fiber prepreg scrap is primarily generated during ply cutting operations or is in the form of expired prepreg or prepreg beyond its recommended lifetime or freezer life. In the former case, the scrap waste is typically in the form of very small, randomly sized and shaped pieces, making it highly impractical to remove the backing films for proper recycling. In the latter case, expired materials are often seen as undesirable for recycling purposes, so such waste is either directly disposed of in landfills or donated in whole condition to research universities for research and development purposes. Following research and development, the scrap is often disposed of, once again, by directly depositing it in landfills. It would be desirable to be able to recycle uncured carbon fiber prepreg easily, without the difficulties of first removing the backing films. Thus, a method of recycling carbon fiber prepreg waste and transparent thermoplastic waste solving the aforementioned problems is desired.

SUMMARY

A method of recycling carbon fiber prepreg waste includes transforming carbon fiber prepreg waste, such as offcuts, scrap, defective material and the like, into colored, non-structural elements, such as flat panels or elements having desired sizes and shapes. The carbon fiber prepreg waste can be uncured and can include the backing film associated with the carbon fiber prepreg (typically in the form of a colored polyethylene layer). The carbon fiber prepreg waste is first collected, then shredded and inserted into either an open or a closed mold. The carbon fiber prepreg waste is then inserted into a hot press, where the shredded carbon fiber prepreg waste is cured under selected temperature and pressure for a selected period of time, dependent upon the particular volume of waste and the desired recycled product. Alternatively, the shredded carbon fiber prepreg waste may be rolled in a hot metallic roller to produce the recycled panel. As a further alternative, the shredded carbon fiber prepreg waste may be extruded in a hot melt extruder to produce a recycled element.

In an alternative method, carbon fiber prepreg waste and transparent thermoplastic waste can be recycled. The transparent thermoplastic and the carbon fiber prepreg can be separately shredded. The carbon fiber prepreg waste can include a colored backing film. The colored backing film may have a plurality of colors associated therewith, yielding a mixture of multi-colored shreds. A mold is filled with the shredded volume of transparent thermoplastic waste, and the mold is inserted and compressed in a hot press. The mold may be a closed mold. The shredded volume of transparent thermoplastic waste is cured in the hot press to produce a transparent sheet.

The shredded volume of carbon fiber prepreg waste is then heated, such as, for example, with hot air, and then spread on the transparent sheet. The heated, shredded volume of carbon fiber prepreg waste and the transparent sheet are hot pressed to form a colored sheet with a transparent protective layer.

In an alternative embodiment, rather than providing a colored backing film, a hard material waste is crushed to produce waste particles having at least one color associated therewith. For example, the hard material waste may be waste ceramic, waste marble, waste stone, waste colored glass, waste granite or the like. A volume of transparent thermoplastic waste and a volume of carbon fiber prepreg waste are both separately shredded, similar to the previous embodiment, and a mold is filled with the shredded volume of transparent thermoplastic waste. The mold may be a closed mold. The mold is inserted and compressed in a hot press, and the shredded volume of transparent thermoplastic waste is cured in the hot press to produce a transparent sheet.

The shredded hard waste particles are spread on the transparent sheet and, separately, the shredded volume of carbon fiber prepreg waste is heated, such as with hot air, for example. The heated, shredded volume of carbon fiber prepreg waste is then spread on the waste particles on the transparent sheet. The heated, shredded volume of carbon fiber prepreg waste, the waste particles and the transparent sheet are hot pressed to form a colored sheet with hard pieces coated with a transparent protective layer.

In a further alternative embodiment, a colored backing film is removed from a volume of carbon fiber prepreg waste, and the colored backing film and the volume of carbon fiber prepreg waste are each shredded separately. The colored backing film may have a plurality of colors associated therewith, yielding a mixture of multi-colored shreds. A volume of transparent thermoplastic waste is also shredded. The volume of carbon fiber prepreg waste is cured in an autoclave to produce a cured sheet. A mold is filled with the shredded volume of transparent thermoplastic waste, the shredded colored backing film and the cured sheet, such that the shredded colored backing film is sandwiched between the shredded volume of transparent thermoplastic waste and the cured sheet. The mold may be a closed mold.

The mold is inserted and compressed in a hot press. The shredded volume of transparent thermoplastic waste, the shredded colored backing film and the cured sheet are cured in the hot press to produce a colored sheet with a transparent layer.

These and other features of the present disclosure will become readily apparent upon further review of the following specification and drawings.

DETAILED DESCRIPTION OF THE PREFERRED EMBODIMENTS

A method of recycling carbon fiber prepreg waste includes recycling carbon fiber prepreg waste, such as offcuts, scrap, defective material and the like, into colored, non-structural elements, such as flat panels. Uncured carbon fiber prepreg waste is first collected. The carbon fiber prepreg waste can include the backing film associated with the carbon fiber prepreg (typically in the form of a colored polyethylene layer). The uncured carbon fiber prepreg waste is then shredded and inserted into either an open or a closed mold. The mold is then inserted into a hot press, where the shredded carbon fiber prepreg waste is cured under selected temperature and pressure for a selected period of time, dependent upon the particular volume of waste and the desired recycled product. Alternatively, the shredded carbon fiber prepreg waste may be rolled in a hot metallic roller to produce the recycled panel. As a further alternative, the shredded carbon fiber prepreg waste may be extruded in a hot melt extruder to produce a recycled element. The recycled prepreg waste can be used as sustainable non-structural elements for subsidiary applications relating to construction or aerospace, for example.

In an example of hot press curing using an open mold, an open square mold with 25 inch sides was filled with shredded carbon fiber prepreg waste (including the associated colored polyethylene backing material). The shredded carbon fiber prepreg waste was held in the mold between two aluminum foil layers which had been coated with a thin industrial wax, which is commonly used as a mold release agent. The hot press was heated for 30 minutes to a temperature of 100° F. to provide ample time for the mold to absorb the heat. Then, the mold was heated in the press at 270° F., under a pressure of 1500 lbs., for a period of 30 minutes. After 30 minutes, the pressure was released and the hot press heater was switched off. The mold was removed from the hot press and left to cool to room temperature. The aluminum foil films were removed, yielding a colored panel of recycled carbon fiber prepreg waste.

As noted above, alternatively, a closed mold may be used. For example, a typical two-piece, metallic mold can be used to produce a recycled product having a desired size and shape. The shredded carbon fiber prepreg waste can be added to the mold and the mold can then be inserted in the hot press. The temperature, pressure and time can be selected dependent upon the volume of waste used, as well as the particular recycled element being produced.

As a further alternative, as noted above, the shredded carbon fiber prepreg waste can be rolled using a hot metallic roller. Again, the temperature, pressure and time can be selected dependent upon the volume and type of waste used, as well as the particular dimensions of the recycled panel being produced. The roller would allow for production of a continuous sheet or the like. Additionally, a recycled element can be produced by forcing the shredded carbon fiber prepreg waste into a hot melt extruder. Here, the temperature of the hot melt extruder's heaters may be selected, as well as the pressure produced by the extruder screw(s). The temperature and pressure can be selected dependent upon the volume and type of waste used, as well as the particular size and shape of the recycled element being produced.

In an alternative method of recycling carbon fiber prepreg waste and transparent thermoplastic waste, both a volume of transparent thermoplastic waste and a volume of carbon fiber prepreg waste are shredded. The carbon fiber prepreg waste can include a colored backing film. The transparent thermoplastic waste may be any suitable type of transparent thermoplastic waste material, such as polyethylene terephthalate (PET) or the like. The colored backing film may have a plurality of colors associated therewith, yielding a mixture of multi-colored shreds. A mold is filled with the shredded volume of transparent thermoplastic waste, and the mold is inserted and compressed in a hot press. The mold may be a closed mold. The shredded volume of transparent thermoplastic waste is cured in the hot press to produce a transparent sheet. Hot pressing may be performed in a temperature controlled system, with the selected parameters being dependent upon the particular choice of the transparent thermoplastic material. As an alternative, injection molding may be used. Depending on the desired thickness of the transparent sheet, the volume of initial transparent thermoplastic material may be adjusted.

The shredded volume of carbon fiber prepreg waste is then heated, such as, for example, with hot air, and then spread on the transparent sheet. For example, the shredded volume of carbon fiber prepreg waste may be heated with hot air in a hot air oven or chamber. The hot air is applied to heat the carbon fiber prepreg waste to a temperature around the epoxy temperature used to produce the carbon fiber prepreg. The heated, shredded volume of carbon fiber prepreg waste and the transparent sheet are hot pressed to form a colored sheet with a transparent protective layer. The temperature, pressure and curing time of the hot pressing are variable, dependent upon the desired material properties of the final product.

In an alternative embodiment, rather than providing a colored backing film, a hard material waste is crushed to produce hard waste particles having at least one color associated therewith. For example, the hard material waste may be waste ceramic, waste marble, waste stone, waste colored glass, waste granite or the like. A volume of transparent thermoplastic waste and a volume of carbon fiber prepreg waste are both separately shredded, similar to the previous embodiment, and a mold is filled with the shredded volume of transparent thermoplastic waste. The mold may be a closed mold. The transparent thermoplastic waste may be any suitable type of transparent thermoplastic waste material, such as polyethylene terephthalate (PET) or the like.

The mold is inserted and compressed in a hot press, and the shredded volume of transparent thermoplastic waste is cured in the hot press to produce a transparent sheet. Hot pressing may be performed in a temperature controlled system, with the selected parameters being dependent upon the particular choice of the transparent thermoplastic material. As an alternative, injection molding may be used. Depending on the desired thickness of the transparent sheet, the volume of initial transparent thermoplastic material may be adjusted.

The waste particles are spread on the transparent sheet and, separately, the shredded volume of carbon fiber prepreg waste is heated, such as with hot air, for example. For example, the shredded volume of carbon fiber prepreg waste may be heated with hot air in a hot air oven or chamber. The hot air is applied to heat the carbon fiber prepreg waste to a temperature around the epoxy temperature used to produce the carbon fiber prepreg. The heated, shredded volume of carbon fiber prepreg waste is then spread on the waste particles on the transparent sheet. The heated, shredded volume of carbon fiber prepreg waste, the waste particles and the transparent sheet are hot pressed to form a colored sheet with a transparent protective layer. The temperature, pressure and curing time of the hot pressing are variable, dependent upon the desired material properties of the final product.

In a further alternative embodiment, a colored backing film is removed from a volume of carbon fiber prepreg waste, and the colored backing film and the volume of carbon fiber prepreg waste are each shredded separately. The colored backing film may have a plurality of colors associated therewith, yielding a mixture of multi-colored shreds. A volume of transparent thermoplastic waste is also shredded. The transparent thermoplastic waste may be any suitable type of transparent thermoplastic waste material, such as polyethylene terephthalate (PET) or the like. The volume of carbon fiber prepreg waste is cured in an autoclave to produce a cured sheet, which is left to cool.

A mold is filled with the shredded volume of transparent thermoplastic waste, the shredded colored backing film and the cured sheet, such that the shredded colored backing film is sandwiched between the shredded volume of transparent thermoplastic waste and the cured sheet. The mold may be a closed mold. The mold is inserted and compressed in a hot press. The shredded volume of transparent thermoplastic waste, the shredded colored backing film and the cured sheet are cured in the hot press to produce a colored sheet with a transparent layer.

It is to be understood that the method of recycling carbon fiber prepreg waste and transparent thermoplastic waste is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of recycling carbon fiber prepreg waste and transparent thermoplastic waste, comprising the steps of:
   shredding a volume of transparent thermoplastic waste;
   shredding a volume of carbon fiber prepreg waste, wherein the carbon fiber prepreg waste includes a colored backing film;
   filling a mold with the shredded volume of transparent thermoplastic waste;
   inserting and compressing the mold in a hot press;
   curing the shredded volume of transparent thermoplastic waste in the hot press to produce a transparent sheet;
   heating the shredded volume of carbon fiber prepreg waste;
   spreading the heated, shredded volume of carbon fiber prepreg waste on the transparent sheet; and
   hot pressing the heated, shredded volume of carbon fiber prepreg waste and the transparent sheet to form a colored sheet with a transparent layer.

2. The method of recycling carbon fiber prepreg waste and transparent thermoplastic waste as recited in claim 1, wherein the colored backing film has a plurality of colors.

3. The method of recycling carbon fiber prepreg waste and transparent thermoplastic waste as recited in claim 1, wherein the step of filling the mold with the shredded volume of transparent thermoplastic waste comprises filling a closed mold with the shredded volume of transparent thermoplastic waste.

4. The method of recycling carbon fiber prepreg waste and transparent thermoplastic waste as recited in claim 1, wherein the step of heating the shredded volume of carbon fiber prepreg waste comprises heating the shredded volume of carbon fiber prepreg waste with hot air.

5. A method of recycling carbon fiber prepreg waste and transparent thermoplastic waste, comprising the steps of:
   shredding a volume of transparent thermoplastic waste;
   crushing hard material waste to produce waste particles, wherein the hard material waste has at least one color associated therewith;
   shredding a volume of carbon fiber prepreg waste;
   filling a mold with the shredded volume of transparent thermoplastic waste;
   inserting and compressing the mold in a hot press;
   curing the shredded volume of transparent thermoplastic waste in the hot press to produce a transparent sheet;
   spreading the waste particles on the transparent sheet;
   heating the shredded volume of carbon fiber prepreg waste;
   spreading the heated, shredded volume of carbon fiber prepreg waste on the waste particles on the transparent sheet; and
   hot pressing the heated, shredded volume of carbon fiber prepreg waste, the waste particles and the transparent sheet to form a colored sheet with a transparent layer.

6. The method of recycling carbon fiber prepreg waste and transparent thermoplastic waste as recited in claim 5, wherein the step of filling the mold with the shredded volume of carbon fiber prepreg waste comprises filling a closed mold with the shredded volume of carbon fiber prepreg waste.

7. The method of recycling carbon fiber prepreg waste and transparent thermoplastic waste as recited in claim 5, wherein the hard material waste is selected from the group consisting of ceramic, marble, stone, colored glass and granite.

8. The method of recycling carbon fiber prepreg waste and transparent thermoplastic waste as recited in claim 5, wherein the step of heating the shredded volume of carbon fiber prepreg waste comprises heating the shredded volume of carbon fiber prepreg waste with hot air.

9. A method of recycling carbon fiber prepreg waste and transparent thermoplastic waste, comprising the steps of:
   shredding a volume of transparent thermoplastic waste;
   removing a colored backing film from a volume of carbon fiber prepreg waste;
   shredding the volume of carbon fiber prepreg waste;
   shredding the colored backing film;
   curing the volume of carbon fiber prepreg waste in an autoclave to produce a cured sheet;
   filling a mold with the shredded volume of transparent thermoplastic waste, the shredded colored backing film and the cured sheet, wherein the shredded colored backing film is sandwiched between the shredded volume of transparent thermoplastic waste and the cured sheet;
   inserting and compressing the mold in a hot press; and
   curing the shredded volume of transparent thermoplastic waste, the shredded colored backing film and the cured sheet in the hot press to produce a colored sheet with a transparent layer.

10. The method of recycling carbon fiber prepreg waste and transparent thermoplastic waste as recited in claim 9, wherein the colored backing film has a plurality of colors.

11. The method of recycling carbon fiber prepreg waste and transparent thermoplastic waste as recited in claim 9, wherein the step of filling the mold with the shredded volume of transparent thermoplastic waste, the shredded colored backing film and the cured sheet comprises filling a closed mold with the shredded volume of transparent thermoplastic waste, the shredded colored backing film and the cured sheet.

\* \* \* \* \*